Dec. 17, 1968     D. D. KRONHOLM     3,416,419

TANDEM ROLLER

Filed Aug. 7, 1967     2 Sheets-Sheet 1

DONALD D. KRONHOLM
INVENTOR

BY
BUCKHORN, BLORE, KLARQUIST & SPARKMAN
ATTORNEYS

Dec. 17, 1968  D. D. KRONHOLM  3,416,419
TANDEM ROLLER

Filed Aug. 7, 1967  2 Sheets-Sheet 2

DONALD D. KRONHOLM
INVENTOR

BY
BUCKHORN, BLORE, KLARQUIST & SPARKMAN
ATTORNEYS

United States Patent Office 3,416,419
Patented Dec. 17, 1968

3,416,419
TANDEM ROLLER
Donald D. Kronholm, Portland, Oreg., assignor to Hyster Company, Portland, Oreg., a corporation of Nevada
Filed Aug. 7, 1967, Ser. No. 658,672
38 Claims. (Cl. 94—50)

ABSTRACT OF THE DISCLOSURE

This application discloses a tandem roller especially suited for compacting road surfacing materials such as asphalt. The roller includes a front steerable roll and a rear driven roll which together support a frame composed of a platform between the rolls, longitudinal side frame members on opposite sides of the traction roll and a gooseneck extending forwardly from the platform over the front roll for connection to a steering yoke. A driver's compartment on the platform has a pair of operator seats facing inwardly toward one another on opposite sides of and below the upper level of the gooseneck, which is extremely narrow so that the operator has a clear view of the steering roll. A single steering wheel is positioned on one side of and between the seats, and a directional control bar is positioned on the opposite side of and between the seats so that the operator can control the roller from either seat and in either direction with equal facility. The engine compartment is positioned behind the seats toward the traction roll, and a water supply tank for a sprinkler system is positioned beneath the seats. Neither of the two rolls is shrouded and the longitudinal side frame members are of a narrow, thin design which permit an unobstructed view of the traction roll from the operator's seats.

The traction roll is driven hydrostatically. An internal combustion engine drives a pressure compensated hydraulic pump on the platform which delivers pressure fluid to a hydraulic motor within one end of the traction roll. Rotary power is transmitted from the hydraulic motor through a drive shaft extending through the center of the traction roll to a planetary gear reduction final drive unit mounted within the opposite end of the roll. As a consequence, none of the drive components project outwardly of the smooth frame contour to obscure visibility from the operator's seat to the traction roll. The planetary final drive is totally sealed and runs in oil for reduced maintenance. Special mounts secured the traction roll to the side frame members and permit easy removal of the roll from the frame without disturbing the planetary drive unit and permit ready access to the hydraulic motor through an access opening in the associated side frame member.

BACKGROUND OF THE INVENTION

(a) Field of the invention

The present invention relates to compaction equipment and more particularly to a tandem roller of the type used in compacting surfacing materials such as asphalt for roads and the like.

(b) Description of the prior art

In operation a tandem roller is normally driven back and forth over the surfacing material to be compacted, with the roller moving in reverse about as much as it moves forward. Therefore operator visibility and control in both directions is important. Moreover, for working close to curbs and buildings, driver visibility of the lower, surface contacting opposite ends of the two rolls is especially important and has been a major problem with prior rollers because of the combination of several factors including the following: (1) the operator has usually been seated high above the rolls on top of the engine compartment and centered above the gooseneck, making visibility of the opposite lower end portions of the two rolls difficult if not impossible; (2) the operators visibility of the rolls has been blocked by massive frame structure and shrouding, especially surrounding the rolls; (3) the operator's seat generally has faced toward the traction roll and has been centered between the opposite sides of the roller, further decreasing visibility of both rolls and especially the steering roll; (4) prior tandem rollers have commonly incorporated bulky drive train components extending between the internal combustion engine carried between the rolls and a massive final drive at the traction roll, with such final drive and drive train components and their shrouding projecting beyond the normal contour of the frame and thus further reducing visibility toward the traction roll; (5) the gooseneck portion of the frame has been substantially as wide as the remainder of the body and frame, thus obscuring visibility toward the steering roll; especially with the operator's seat positioned as aforesaid; and (6) prior rollers have usually incorporated a gravity feed water sprinkling system including a water tank mounted over the traction roll, further reducing visibility toward the rear of the roller.

Most prior tandem rollers have been far more difficult to control when moving in a forward direction than when moving in reverse because of the rear, traction roll-facing seat and the positioning of the operating controls in front of the rear-facing seat.

Prior tandem rollers also have commonly employed shielded open gears for the final drive at the traction roll, which permit dirt and rock particles to enter and which require frequent lubrication and other maintenance by the operator or maintenance personnel.

SUMMARY OF THE INVENTION

The tandem roller of the present invention overcomes the aforementioned problems of the prior art through a general reorganization, redesign and new combination of components that make up the machine. The result is a tandem roller providing vastly improved visibility, equal ease of control in forward and reverse and exceptionally low-maintenance operation. Major objects of the invention are to provide:

(1) A tandem roller having improved operator visibility toward both rolls;

(2) A tandem roller which is easier to control than prior such rollers and which provides equal ease of control in both directions;

(3) A tandem roller requiring minimum maintenance, especially of the drive train and particularly the final drive, and one that facilitates maintenance when required;

(4) A tandem roller having a planetary final drive for the traction roll;

(5) A tandem roller with a completely sealed final drive unit which runs in oil so as not to require frequent manual application of lubricant;

(6) A tandem roller having an exceptionally compact drive arrangement, a major portion of which is mounted within the confines of the traction roll for improved visibility;

(7) A tandem roller having an improved mounting of the traction roll on the frame providing easy installation and removal of drive train components from the traction roll and easy attachment and detachment of the roll from the roller frame;

(8) A tandem roller having an improved and unique interrelationship of operator seating, controls, water tank, and other components for increased operator visibility and control in both directions;

(9) A tandem roller having an improved novel and sleek overall configuration incorporating a minimum of shrouding, low profile and slim gooseneck for increased operator visibility and control; and

(10) A tandem roller having a hydrostatic drive arrangement incorporating a pressure compensated hydrostatic pump which prevents engine stalling on grades or when encountering exceptional rolling resistance, for preventing lugging of the engine and for enabling the engine and other drive components to operate at lower more efficient temperatures than would otherwise be possible.

BRIEF DESCRIPTION OF THE DRAWINGS

The above and other objects and advantages of the present invention will become more apparent from the following detailed description which proceeds with reference to the accompanying drawings wherein.

DETAILED DESCRIPTION

Figure 1:
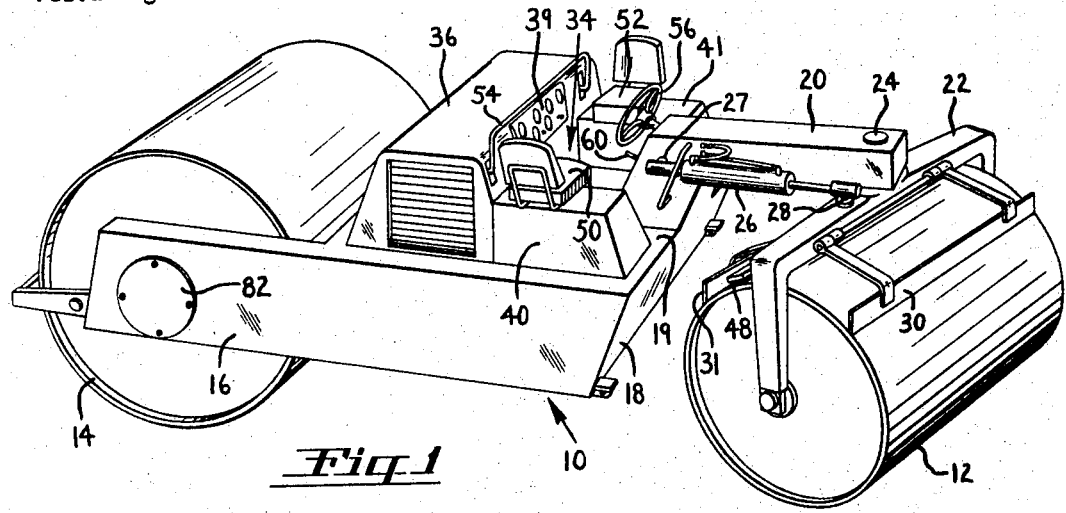
FIG. 1 is a perspective view of a tandem roller in accordance with the present invention.
Figure 2:
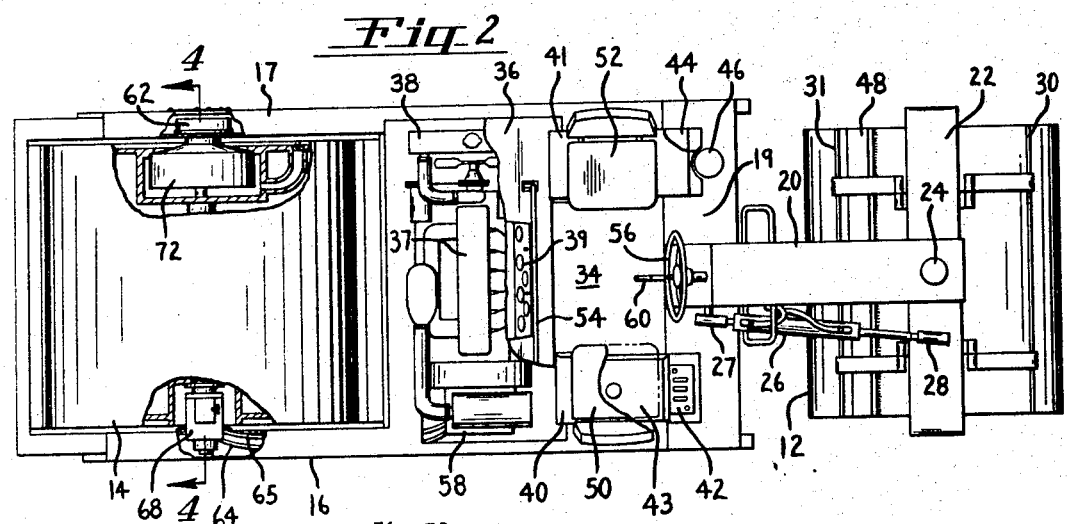
FIG. 2 is a top plan view of the roller of FIG. 1 with portions of the traction roll and engine shrouding broken away for clarity of illustration.
Figure 3:
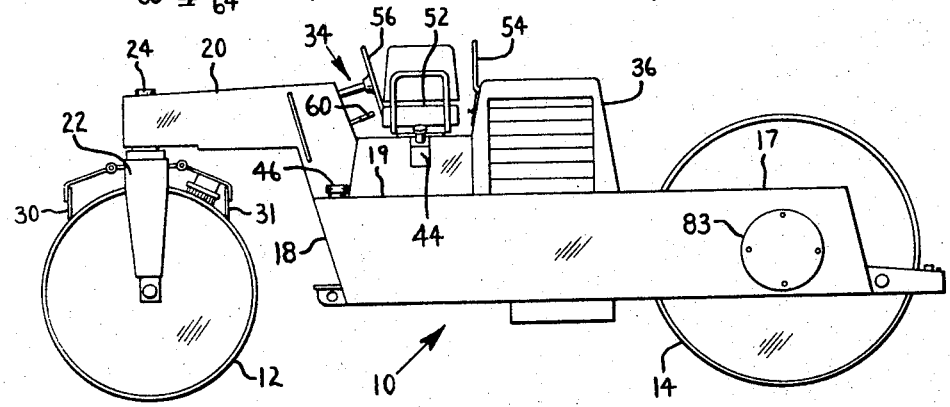
FIG. 3 is a side elevational view of the side of the roller opposite that shown in FIG. 1 on a scale slightly reduced from that of FIG. 2.

With reference to the drawings, FIGS. 1, 2 and 3 disclose a tandem roller including a frame indicated generally at 10 supported at one end by a steerable hollow steel roll 12 and at the other end by a similar cylindrical traction roll 14. The frame includes a pair of longitudinal opposite side frame members 16, 17 extending toward and on opposite sides of the traction roll from a main frame portion 18 including a platform 19 disposed between the rolls. A slender gooseneck 20 extends upwardly and cantilevers forwardly from a front end portion of platform 19 to overlie steering roll 12. A steering yoke 22 is rotatably connected at its opposite ends to the steering roll and includes a center trunnion 24 rotatably connecting the yoke to the forward end of the gooseneck. Roll 12 is steered by hydraulic steering cylinder 26 connected at one end 27 to an inner end of the gooseneck and at its opposite, piston rod end 28 to yoke 22 at a position offset from trunnion 24. The steering yoke mounts the usual wheel cleaning blades 30, 31.

Main platform 19 includes at its front end a driver's compartment 34 and at its rear end just behind the driver's compartment an engine compartment 36 shrouding a transversely positioned internal combustion engine 37 having a radiator 38. In fact, the forward face of the engine shrouding defines the rearward extent of the operator's compartment and mounts a control panel 39. At the opposite sides of the driver's compartment a pair of forwardly extending raised housings 40, 41 mount, respectively, a battery 42 and hydraulic tank 43 in housing 40 and a gasoline tank 44 within housing 41. Beneath the forward end of the platform and beneath the driver's compartment a water tank 46 supplies water to the usual sprinkler system (not shown) mounted in conjunction with a cocomat 48 on the rolls. The water tank is a positive feed tank and includes its own water pump (not shown) driven by an electric motor (not shown) also housed beneath platform 19.

Mounted on top of housings 40, 41 in the driver's compartment are a pair of operator seats 50, 52. The seats are positioned on opposite sides of the longitudinal center line of the frame and face inwardly toward one another. The seats are also positioned near the extreme opposite sides of the platform, beside the engine compartment and on a level such that operator can see over the top of the latter compartment. The seats are also at a level slightly below the uppermost surface of the gooseneck. Thus the positioning of the seats provides unusually good visibility of the lower, surface-engaging opposite ends of both rolls 12, 14. This is particularly helpful in tandem rollers where the operator must accurately align at least one roll with the edge of the surface under compaction, as for example, next to curbing to produce a clean, compacted gutter line.

The operating controls for the roller are arranged in relation to the seats so that the operator can operate the roller with equal facility in both forward and reverse, with good visibility in either direction. In this connection, the controls include a combination directional and steering control bar 54 on the engine compartment shrouding 36 and extending between the seats, and a steering wheel 56 carried on the gooseneck 20 and midway between the seats. The direction of the roller is controlled by pushing or pulling the bar in the desired direction of movement. For example, if the operator wishes to move the machine in reverse, he simply pushes the bar toward the traction roll. If he wants to go forward, he pulls the bar toward the steering roll. Speed is controlled by the distance through which the bar is pushed or pulled in the desired direction of movement from a normal neutral position.

A complex linkage connects the control bar 54 with a throttle (not shown) of engine 37 and with a cam control (not shown) on a hydrostatic pump 58 driven by engine 38. Speed is controlled by varying both engine throttle and the pump cam angle simultaneously in a well known manner as the control bar moves. Direction is controlled by the linkage to the pump, which adjusts the position of cam on one side or the other of a center position, also in a well known manner. The details of the speed and directional control linkage form no part of the present invention, and therefore such linkage is not shown or described in further detail.

Besides the control bar and steering wheel previously mentioned, the driver's compartment includes a parking brake control lever 60 which operates a conventional drum brake 62 (FIGS. 2 and 4) which acts to brake the final drive to traction roll 14.

From the foregoing it will be apparent that the operator can drive the machine in either direction and from either seat with equal facility and with good visibility. Visibility is enhanced by the positioning of the engine compartment beside the operators' seats rather than below them so that the seats are relatively low in relation to the rolls. Visibility is further enhanced by the position of the water tank beneath the operator's compartment rather than above the traction roll as is the case with most gravity feed tandem rollers. Moreover, the gooseneck 20 is of a unique laterally slim configuration throughout its full longitudinal extent so that it does not obstruct the operator's view of the steering roll. As will be evident from FIG. 2, the opposed seats 50 and 52 are actually positioned well on opposite sides of the gooseneck, providing the operator with a clear view or both ends of the steering roll.

Another important feature facilitating visibility is the absence of shrouding about either the steering roll or the traction roll so common with other tandem rollers. In fact, vitually all shrouding is eliminated except that incidental to some components on the engine platform.

Longitudinal side frame members 16 and 17 are exceptionally thin in a transverse direction and vertically narrow, terminating vertically just above and just below the center of the traction roll to leave the upper and lowermost end portions of the roll well exposed to view.

With reference to FIG. 2, a hydrostatic drive arrangement drives traction roll 14. Such arrangement includes the internal combustion engine 37 which drives hydrostatic pump 58. The pump in turn delivers hydraulic fluid through lines 64, 65 extending within longitudinal side frame member 16 to a hydraulic motor 68 mounted within one end of the traction roll and wholly within the confines of side frame member 16. Hydraulic motor 68 in turn transmits rotary power through a drive shaft 70 extending axially through the center of traction roll 14 to a planetary gear type speed reducing final drive unit 72 mounted within the opposite end of the traction roll. Since the final drive and its associated hydraulic motor 68 are mounted within the smooth flat profile of the longitudinal side frame members, they do not obstruct driver visibility to the traction roll, unlike prior art rollers having the usual mechanical drive to a massive bull gear at the traction roll.

Variable displacement pump 58 incorporates a pressure compensation feature which prevents the engine from stalling when the machine is ascending steep grades or encounters unusually high rolling resistance. The pump is of a well known construction and is therefore not described in detail. A suitable pump for the purpose is a hydreco model 45L0745. In general, this pump has a piston cam plate (not shown) the position of which depends upon the pressure required to drive the hydrostatic motor. If low pressure is required to drive the motor, the cam plate is at a maximum angle and the pump displacement therefore is at a maximum. As the pressure to drive the motor increases, as in ascending a grade, the pump cam angle is caused to decrease by a complex valving arrangement (not shown) sensitive to system pressure. Just before system pressure reaches a point where engine torque would no longer be sufficient to drive the pump, the valving system causes the cam plate angle to move to nearly zero, thus allowing the pump and engine to continue turning and system pressure to be maintained without any fluid displacement above that required to satisfy leakage. If the roller encounters a grade too steep for the engine, the pump displacement will be cut to nearly zero and the roller will stop. However, the engine and pump will continue turning, and system pressure will be maintained, thus preventing the machine from rolling backward.

Figure 4:
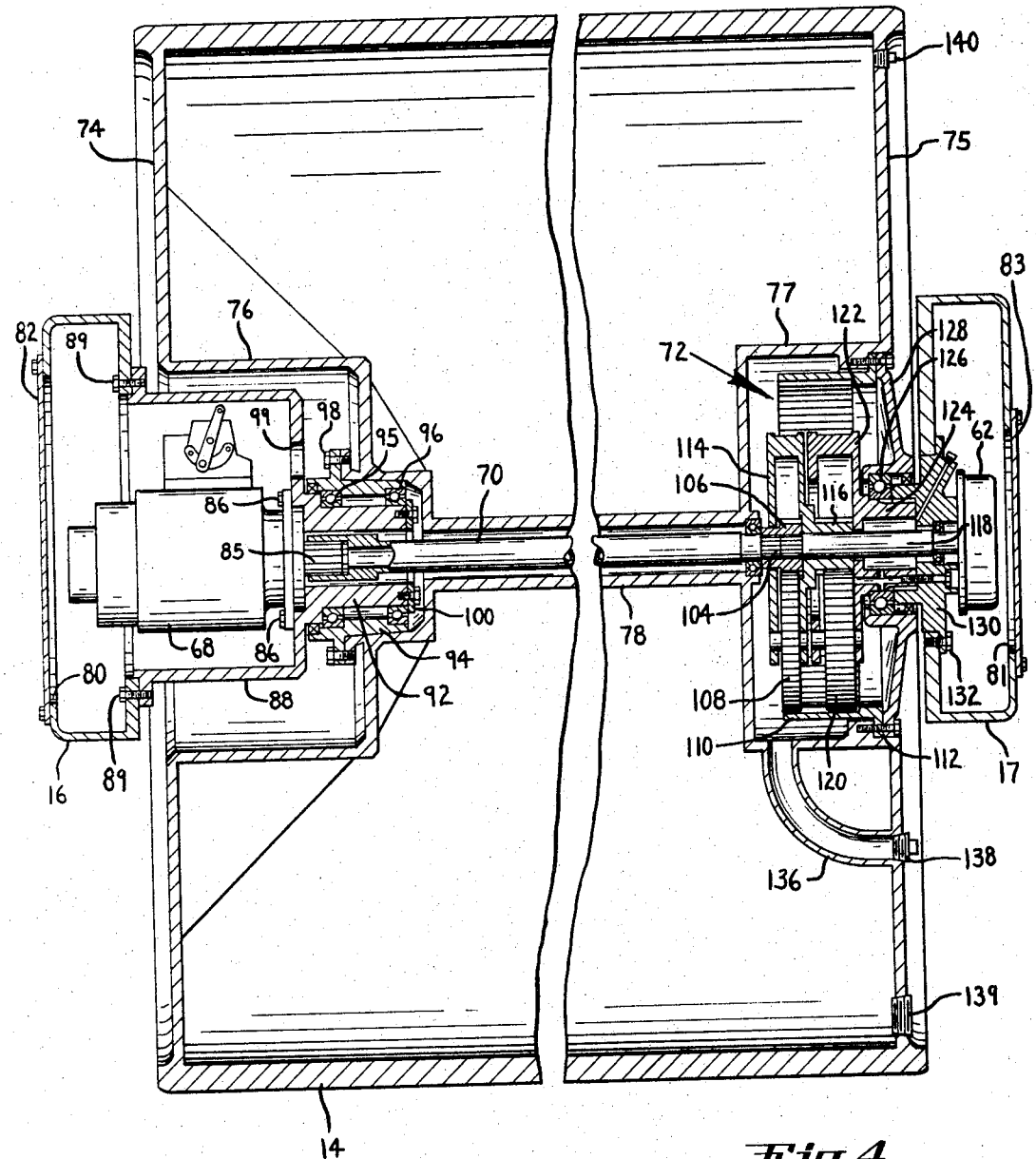
FIG. 4 is an enlarged vertical sectional view through the traction roll taken along the line 4—4 of FIG. 2.

With reference to FIG. 4, traction roll 14 includes opposite endwalls 74, 75 having, respectively, inset central portions 76, 77 defining compartments for receiving hydraulic motor 68 and planetary final drive 72. Compartments 76 and 77 are interconnected by a tubular central roll portion 78 through which drive shaft 70 extends. Longitudinal side frame members 16, 17 are hollow and open inwardly for accommodating a portion of the hydraulic motor and brake portion of the planetary final drive. Each side frame member has a large outer access opening 80, 81 which is closed by a removable cover plate 82, 83, respectively.

Hydraulic motor 68 is a variable displacement piston-type hydrostatic motor which is completely sealed for low maintenance operation. The motor is mounted in axial alignment with shaft 70 and has a splined connection therewith at 85. The motor is fastened by screw connectors 86 to a motor mount 88 which is detachably connected at its flanged outer end to side frame member 16 by fasteners 89. The motor mount includes an inwardly projecting inner end portion 92 of reduced diameter which has an axial sliding fit with a bearing carrier 94 mounting a pair of roller bearings 95, 96. Bearing carrier 94 likewise has an axial sliding fit with a recessed portion of roll member 76 and is fastened by screw connectors 98 to the flanged portion of the roll member. Access to fasteners 98 may be gained through an access opening 99 in motor mount 88. Thus it will be apparent that bearings 95, 96 and the associated carrier portions 92, 94 rotatably mount roll 14 on the frame, with the carrier 94 rotating with the roll and motor mount 88 remaining stationary with the frame.

A bearing retainer plate 100 fastened to the inner end of motor mount portion 92 enables removal of bearing carrier 94 and motor mount 88 from the roll as a unit after the roll has been removed from the frame.

Planetary final drive unit 72 is a coupled double planetary gear arrangement driven by the floating drive shaft 70. Shaft 70 is splined at 104 to a first sun gear 106 of the final drive. The sun gear in turn meshes with a first set of planetary pinion gears 108 which in turn are in mesh with a ring gear 110 connected at 112 to the traction roll. Planetary pinions 108 are rotatably carried by first planet carrier 114, which is integral with a second sun gear 116 rotatably carried on an extension 118 of drive shaft 70 extending from a splined connection with shaft 70 through the planetary unit to drum brake 62. Sun gear 116 meshes with a second set of planetary pinion gears 120 carried by a second planet carrier 122. Planetary pinions 120, like pinions 108, are in mesh with ring gear 110. A hub extension 124 of planet carrier 122 is mounted by roller bearings 126 for rotation relative to a roll hub 128. Hub 128 is fixed to end 75 of the roll at 112.

A roll mounting member 130 within side frame member 17 has an axial sliding fit with roll hub 128 and is detachably fastened to side frame member 17 by connectors 132. Thus the traction roll can be removed from the frame with the planetary drive remaining intact within the roll simply by removing cover plate 83 from side frame member 17, detaching roll mount 130 from the frame and removing it axially through access opening 81. At the same time hydraulic motor 68 is detached from its mount 88 and removed through access opening 80 of side frame member 16, and fasteners 89 are removed to disconnect the motor mount from the frame. Thereafter roll 14 is removed rearwardly from between the side frame members.

The roll end portion 77 defining the final drive compartment and roll hub 128 completely seal the planetary drive unit 72 from dirt and rock particles. Such compartment is filled with oil through an oil passage 136 having an access opening at end wall 75 of the roll closed by a screw cap 138. When oil passage 136 is in a lower position as shown in FIG. 4, it serves as an oil drain passage; but when the same passage is in an upper position above shaft 70, it serves as an oil filler passage. Since the planetary final drive is completely sealed and continuously bathed in oil, the constant painting of gears required with other tandem roller using open shielded gears for the final drive is completely eliminated, and very little maintenance of the planetary drive unit is required. Yet when servicing is required, access to the planetary drive unit is simplified by the mounting arrangement described which provides for easy removal of the roll from the frame.

The use of the hydrostatic drive system as described together with the planetary final drive provides a compact system that, as already noted, can be mounted within the confines of the frame and traction roll without the use of shrouding and without obstructing the visibility of the operator.

Both the traction roll and the steering roll are hollow and may be filled with water ballast. For example, traction roll 14 is filled with water through access openings in end wall 75 capped by screw plugs 139, 140.

From the foregoing it will be apparent that the roller of the present invention provides exceptional visibility in both directions of movement and to the lower surface-engaging end portions of both rolls, improved ease of operator control, and equal ease of control in forward and reverse. Having described a preferred embodiment of the invention, it should be apparent to those having skill in the art that the same permits of modifictaion in arrangement and detail. I claim as my invention all such modifications as come within the true spirit and scope of the following claims.

I claim:

1. A compaction vehicle having a frame supported at one end by a driven roller and at the other end by a steerable roller, said frame including a main frame portion disposed horizontally between said driven roller and said steerable roller, a pair of elongate, thin and narrow longitudinal side frame members extending toward and on opposite sides of said driven roller from said main frame portion and journaling said driven roller on said frame, said longitudinal side frame members extending substantially parallel to a longitudinal center plane of said vehicle and having upright planar outer side surfaces defining the laterally outer limits of said frame, said outer side surfaces lying closely adjacent to the opposite ends of said driven roller and terminating vertically between the upper and lower limits of said driven roller so as to expose to view substantial upper and lower portions of said driven roller, said frame including a narrow gooseneck member extending longitudinally from said main frame along said centerline over said steerable roller, said gooseneck having a maximum width at said main frame substantially less than the overall width of said main frame, an operator's seat on said main frame offset laterally on one side of said centerline and to one side of said gooseneck, and facing in a direction toward the other side of said centerline and normal thereto in a position providing a clear line of vision from said seat to substantial portions of both said rollers on the same side of said centerline as said seat.

2. Apparatus according to claim 1 wherein there are a pair of said seats on said main frame facing inwardly toward one another and disposed laterally on opposite sides of said centerline and gooseneck.

3. Apparatus according to claim 1 including a steering control on one side of said seat toward one of said rollers and a directional control on the other side of said seat toward the other of said rollers within easy reach of an operator in said seat.

4. Apparatus according to claim 2 including a directional control means on one side of said seats toward one of said rollers and a steering control means on the other side of said seats toward the other said roller, said steering and directional control means being positioned laterally between said seats within easy reach of an operator in either said seat.

5. Apparatus according to claim 1 including
a driver's compartment at the steerable roller end of said main frame portion, said compartment including said seat,
water sprinkling means, including a water supply tank carried by said main frame portion beneath said driver's compartment,
and engine means for driving said driven roller carried by said main frame beside said seat and toward said driven roller from said water supply tank.

6. Apparatus according to claim 1 wherein said seat is at a level below the top of said gooseneck.

7. Apparatus according to claim 5 wherein said seat is at a level below the top of said gooseneck.

8. Apparatus according to claim 1 including
an engine carried by said main frame beside said seat at a level substantially no higher than said seat, said engine driving a hydraulic pump means,
hydraulic motor means mounted at one end of said driven roller wholly inwardly of the outer side surface of the adjacent said longitudinal side frame member,
transmission means including brake means mounted at the end of said driven roller opposite said one end and wholly inwardly of the outer side surface of the adjacent said longitudinal side frame member,
power transmitting shaft means extending from said hydraulic motor means through the interior of said driven roller to said transmission means,
and fluid passage means delivering pressure fluid from said pump means to said hydraulic motor means,
whereby there are no drive components extending laterally outwardly beyond the outer limits of said longitudinal side frame members and therefore an unobstructed view from said seat to a lower end edge portion of said driven roller.

9. Apparatus according to claim 5 including
an engine carried by said main frame beside said seat at a level substantially no higher than said seat, said engine driving a hydraulic pump means,
hydraulic motor means mounted at one end of said driven roller wholly inwardly of the outer side surface of the adjacent said longitudinal side frame member,
transmission means including brake means mounted at the end of said driven roller opposite said one end and wholly inwardly of the outer side surface of the adjacent said longitudinal side frame member,
power transmitting shaft means extending from said hydraulic motor means through the interior of said driven roller to said transmission means,
and fluid passage means delivering pressure fluid from said pump means to said hydraulic motor means,
whereby there are no drive components extending laterally outwardly beyond the outer limits of said longitudinal side frame members and therefore an unobstructed view from said seat to a lower end edge portion of said driven roller.

10. Apparatus according to claim 1 comprising
an operator's compartment at the steerable roller end of said main frame portion,
a pair of said operator's seats on said main frame within said compartment and facing inwardly toward one another and disposed laterally on opposite sides of said centerline and gooseneck,
a steering control on one side of said seats toward one of said rollers and a directional control on the other side of said seats toward the other of said rollers, said controls being disposed between said seats within easy reach of an operator in either seat,
water sprinkling means including a water supply tank carried by said main frame portion beneath said operator's compartment,
engine means for driving said driven roller carried by said main frame portion beside said seats and toward said driven roller from said water supply tank,
said seats being disposed at a level vertically below the topmost portion of said gooseneck.

11. Apparatus according to claim 10 including:
hydraulic pump means driven by said engine,
hydraulic motor means mounted at one end of said driven roller wholly within the confines of the adjacent said longitudinal side frame member,
transmission means including brake means mounted at the end of said driven roller opposite said one end and wholly within the confines of the said longitudinal side frame member adjacent said opposite end,
power transmitting shaft means extending from said hydraulic motor means through the interior of said driven roller to said transmission means,
and fluid passage means for delivering pressure fluid from said pump means to said hydraulic motor means.

12. A driving and mounting ararngement for a compaction vehicle of the type having a frame supported in part by a hollow roller to be driven at a relatively slow speed, an internal combustion engine mounted on said frame and operating at a relatively fast speed and driving a hydraulic pump which drives a hydraulic motor which in turn drives said roller through a speed reduction unit, said arrangement comprising,
a motor mount detachably secured to said frame and mounting said hydraulic motor in axial alignment with said roller at one end of said roller,
said motor mount having an axial sliding fit with said roller at said one end and having means adjacent to such axial sliding fit for rotatably connecting said roller to said frame and being separable from said roller in an axial outward direction with respect thereto,
a drive shaft extending from said motor through said roller toward the opposite end of said roller, said speed reduction unit being of planetary design and being mounted in such opposite end of said roller and being drivingly connected to said shaft, a mount for said roller at said opposite end, said mount being detachably secured to said frame and having an axial sliding fit with said roller at said oppoosite end, and having means for rotatably supporting said roller at said opposite end and being separable from said roller in an axially outward direction, whereby said roller may be separated from said frame by detaching said mounts and moving the roller mount outwardly to separate it from said roller, leaving said planetary speed reduction unit in place in said roller.

13. Apparatus according to claim 12 wherein said pump has a variable displacement and means for varying said displacement independent of engine speed in response to changes in hydraulic pressure demand required to drive said hydraulic motor so that when a high hydraulic pressure is required to drive said hydraulic motor, i.e., when the vehicle is ascending a grade, pump displacement is decreased and when a low pressure is required to drive said hydraulic motor, i.e., when the roller is descending a grade, displacement is increased, whereby said engine and pump will continue to function under all operating conditions.

14. Apparatus according to claim 12 wherein said planetary speed reduction unit is totally enclosed within a liquid sealed planetary housing and operated in oil, said housing including means for adding and draining oil therefrom.

15. Apparatus according to claim 12 wherein said frame includes a horizontal platform portion offset longitudinally from said roller at a level between the top and bottom of said roller, an operator's seat facing sideways on said platform, and an engine compartment on said platform beside said seat, said compartment extending upwardly to a level substantially no higher than said seat.

16. Apparatus according to claim 15 including water spray means, said means including a water supply tank mounted on said frame beneath said platform and vertically beneath said seat.

17. A driving and mounting arrangement for a compaction vehicle of the type having a frame supported in part by a hollow roller to be driven at a relatively slow speed, an internal combustion engine mounted on said frame and operated at a relatively fast speed and driving a hydraulic pump which drives a hydraulic motor which in turn drives said roller through a speed reduction unit, said arrangement comprising, a motor mount detachably secured to said frame and mounting said hydraulic motor in axial alignment with said roller at one end of said roller, drive means connecting said motor to said speed reduction unit, said speed reduction unit being of planetary design and being mounted in said roller.

18. Apparatus according to claim 17 wherein said pump has a variable displacement and means for varying said displacement independent of engine speed in response to changes in hydraulic pressure demand required to drive said hydraulic motor so that when a high hydraulic pressure is required to drive said hydraulic motor, i.e., when the vehicle is ascending a grade, pump displacement is decreased and when a low pressure is required to drive said hydraulic motor, i.e. when the roller is descending a grade, displacement is increased, whereby said engine and pump will continue to function under all operating conditions.

19. Apparatus according to claim 17 wherein said planetary speed reduction unit is totally enclosed within a liquid sealed planetary housing and operated in oil, said housing including means for adding and draining oil therefrom.

20. Apparatus according to claim 17 wherein said drive means is a drive shaft extending from said motor through said roller toward the opposite end of said roller, said speed reduction unit being mounted in such opposite end of said roller and being drivingly connected to said shaft.

21. A compaction vehicle of the type having a frame supported in part by a hollow roller to be driven at a relatively slow speed, an internal combustion engine mounted on said frame and operating at a relatively fast speed, a hydraulic pump driven by said engine, a hydraulic motor driven by said pump, and a speed reduction unit driven by said motor, said frame having a horizontal platform portion offset longitudinally from said roller at a level vertically between the top and bottom of said roller, an operator's seat on said platform positioned so that the operator may rest his feet on said platform, and an engine compartment beside said seat, said compartment extending vertically above said platform.

22. Apparatus according to claim 21 including water spray means, said means including a water supply tank mounted on said frame beneath said platform and vertically beneath said seat.

23. A compaction vehicle of the type having a frame supported in part by a hollow roller to be driven at a relatively slow speed, and having an internal combustion engine and water spray means mounted on said frame, said frame including a horizontal platform portion offset longitudinally from said roller at a level vertically between the top and bottom of said roller, an operator's seat above said platform, and an engine compartment on said platform beside said seat, said compartment extending upwardly from said platform, said water spray means including a water supply tank mounted on said frame vertically beneath said platform.

24. In a compaction machine with two ends, a directional control and a steering control, an operator's platform located substantially midway between said ends, a seat on said platform facing substantially at right angles to the longitudinal axis of said machine, said steering control positioned on one side of said seat toward one end of said machine, and said directional control positioned on the other side of said seat toward the other end of said machine.

25. A compaction machine as described in claim 24 including a speed control, wherein said speed control is combined with said directional control.

26. A compaction machine as described in claim 24 wherein said seat is offset on one side of the longitudinal axis of said machine, and wherein there is another seat offset on the other side of said longitudinal axis.

27. In a compaction vehicle of the type having a frame at one end supported by a driven roller and at the opposite end by a steerable roller with said frame supporting means including an engine for driving said roller endwise in opposite directions, and including a main body disposed longitudinally between said driven and steerable rollers, a seating and control arrangement comprising, operator seat means on said main body, said seat means being offset laterally on one side of a longitudinal centerline of said frame and facing in a direction toward the opposite side of said centerline, steering control means positioned on one side of said seat means in a direction toward one of said rollers, and directional control means positioned on the opposite side of said seat means from said steering control means, whereby said vehicle can be driven in either direction with equal facility and optimum visibility.

28. Apparatus according to claim 27 wherein said engine is mounted on said main body at a position offset longitudinally on one side of said seat means at a level substantially no higher than said seat means.

29. Apparatus according to claim 28 including water sprinkling means carried by said frame including a water supply tank mounted on said main body vertically beneath said seat means.

30. Apparatus according to claim 27 wherein said frame includes a narrow neck portion extending longitudinally from said body along the longitudinal centerline thereof toward said steerable roller, the laterally outer limits of said neck portion terminating laterally inwardly of said seat means so as to provide a clear line of vision between said seat means and an end portion of said steerable roller on the same side of said gooseneck as said seat means.

31. Apparatus according to claim 29 wherein said frame includes a narrow neck portion extending longitudinally from said body along the longitudinal centerline thereof toward said steerable roller, the laterally outer limits of said neck portion terminating laterally inwardly of said seat means so as to provide a clear line of vision between said seat means and an end portion of said steerable roller on the same side of said gooseneck as said seat means.

32. Apparatus according to claim 30 wherein said neck portion extends first upwardly from a horizontal platform portion of said main body and then horizontally to a position overlying said steerable roller, said seat means being disposed vertically at a level at least partially below the top of said neck portion so as to provide visibility from said steerable roller beneath said neck portion.

33. A compaction vehicle having a frame supported at one end by a driven roller and at the opposite end by a steerable roller, with said frame supporting an engine and including a main body disposed longitudinally between said driven and steerable rollers, said vehicle being characterized by:

operator seat means mounted on said main body at a position offset laterally on one side of a longitudinal centerline of said frame, said frame including a narrow neck extending longitudinally from said main body toward said steerable roller, the laterally outer limits of said neck terminating laterally inwardly of said seat means so that unobstructed visibility is provided between said seat means and a lower end portion of said roller on the same side of said neck as said seat means.

34. Apparatus according to claim 33 wherein said seat means includes a pair of seats offset one on each of the laterally opposite sides of said neck portion so as to provide unobstructed visibility from said seats to both ends of said steerable roller.

35. Apparatus according to claim 33 wherein said seat means is disposed vertically at a level at least partially below the topmost surface of said neck portion in a position providing visibility therefrom to a portion of said roller extending beneath said neck portion.

36. Apparatus according to claim 33 wherein said main body includes a horizontal platform portion disposed vertically at a level below the upper limits of said rollers, said neck extending from said platform over said steerable roller and having a topmost surface disposed at a level above said platform and steerable roller, said seat means being disposed at a level below the topmost surface of said neck portion.

37. Apparatus according to claim 21 including a steerable roller, said horizontal platform portion being positioned longitudinally between said steerable roller and said driven roller and at a level below the top of said steerable roller.

38. Apparatus according to claim 23 including a steerable roller, said horizontal platform portion being positioned longitudinally between said steerable roller and said driven roller and at a level between the top of said steerable roller.

References Cited

UNITED STATES PATENTS

| | | | |
|---|---|---|---|
| 2,549,182 | 4/1951 | Ekenstam | 94—50 |
| 2,639,652 | 5/1953 | Wright | 94—50 |
| 3,009,401 | 11/1961 | Greiner | 94—50 |
| 3,183,804 | 5/1965 | LeTourneau | 94—50 |
| 3,256,789 | 6/1966 | DeBiasi | 94—50 X |
| 3,303,762 | 2/1967 | Jennings | 94—50 |

NILE C. BYERS, JR., *Primary Examiner.*

UNITED STATES PATENT OFFICE
CERTIFICATE OF CORRECTION

Patent No. 3,416,419                                                                 December 17, 196

Donald D. Kronholm

It is certified that error appears in the above identified patent and that said Letters Patent are hereby corrected as shown below:

Column 11, line 32, after "visibility from said" insert -- seat means to portions of said --.

Signed and sealed this 17th day of March 1970.

(SEAL)
Attest:

Edward M. Fletcher, Jr.                                       WILLIAM E. SCHUYLER, JR.

Attesting Officer                                                        Commissioner of Patents